(12) United States Patent
Park et al.

(10) Patent No.: US 10,937,595 B2
(45) Date of Patent: Mar. 2, 2021

(54) MULTILAYER CERAMIC CAPACITOR INCLUDING ADHESIVE LAYER BETWEEN SIDE MARGIN PORTION AND BODY AND METHOD OF MANUFACTURING THE SAME

(71) Applicant: SAMSUNG ELECTRO-MECHANICS CO., LTD., Suwon-si (KR)

(72) Inventors: Yong Park, Suwon-Si (KR); Jang Yeol Lee, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/169,897

(22) Filed: Oct. 24, 2018

(65) Prior Publication Data
US 2020/0043667 A1  Feb. 6, 2020

(30) Foreign Application Priority Data
Aug. 3, 2018  (KR) ........................ 10-2018-0090717

(51) Int. Cl.
*H01G 4/224* (2006.01)
*H01G 4/30* (2006.01)
(Continued)

(52) U.S. Cl.
CPC .......... *H01G 4/224* (2013.01); *C04B 35/468* (2013.01); *C04B 37/006* (2013.01); *H01G 4/005* (2013.01); *H01G 4/12* (2013.01); *H01G 4/308* (2013.01)

(58) Field of Classification Search
CPC .......... H01G 4/30; H01G 4/12; H01G 4/1227; H01G 4/308; H01G 4/008; H01G 4/224; H01G 4/005
See application file for complete search history.

(56) References Cited

U.S. PATENT DOCUMENTS

| 2012/0147516 A1* | 6/2012 | Kim | .......................... H01G 4/30 361/301.4 |
| 2012/0234462 A1* | 9/2012 | Matsui | ..................... H01G 4/12 156/89.12 |

(Continued)

FOREIGN PATENT DOCUMENTS

| JP | H06-349669 A | 12/1994 |
| JP | 2005259772 A * | 9/2005 |

(Continued)

*Primary Examiner* — David M Sinclair
(74) *Attorney, Agent, or Firm* — Morgan, Lewis & Bockius LLP

(57) ABSTRACT

A multilayer ceramic capacitor includes a ceramic body including a dielectric layer, a first surface and a second surface opposing each other, a third surface and a fourth surface connecting the first surface and the second surface, respectively; internal electrodes disposed inside the ceramic body and exposed to the first and second surfaces, and having one ends exposed to the third surface or the fourth surface; a first side margin portion and a second side margin portion disposed on sides of the internal electrodes exposed to the first and second surfaces; and adhesive layers disposed between the first surface of the ceramic body and the first side margin portion and between the first surface of the ceramic body and the second side margin portion, respectively. An average thickness of each of the first and second side margin portions is 2 µm or more and 10 µm or less.

19 Claims, 7 Drawing Sheets

(51) Int. Cl.
*H01G 4/12*       (2006.01)
*H01G 4/005*      (2006.01)
*C04B 37/00*      (2006.01)
*C04B 35/468*     (2006.01)

(56) References Cited

U.S. PATENT DOCUMENTS

| | | | |
|---|---|---|---|
| 2013/0063862 A1* | 3/2013 | Kim | H01G 4/005 |
| | | | 361/305 |
| 2015/0200055 A1* | 7/2015 | Ishida | H01G 4/012 |
| | | | 361/301.4 |
| 2015/0340155 A1* | 11/2015 | Fukunaga | H01G 4/012 |
| | | | 361/301.4 |
| 2016/0293332 A1 | 10/2016 | Kato et al. | |
| 2017/0169952 A1* | 6/2017 | Kato | H01G 4/005 |
| 2017/0243697 A1* | 8/2017 | Mizuno | H01G 4/308 |
| 2018/0012702 A1* | 1/2018 | Azuma | H05K 1/181 |
| 2018/0096793 A1* | 4/2018 | Fukunaga | H01G 4/2325 |
| 2018/0108482 A1* | 4/2018 | Kogure | H01G 4/008 |
| 2018/0182549 A1* | 6/2018 | Koide | C04B 35/638 |
| 2018/0182555 A1* | 6/2018 | Kowase | H01G 4/30 |

FOREIGN PATENT DOCUMENTS

| | | |
|---|---|---|
| JP | 2012-209539 A | 10/2012 |
| JP | 2015-026721 A | 2/2015 |
| KR | 10-2010-0136917 A | 12/2010 |

\* cited by examiner

MULTILAYER CERAMIC CAPACITOR INCLUDING ADHESIVE LAYER BETWEEN SIDE MARGIN PORTION AND BODY AND METHOD OF MANUFACTURING THE SAME

CROSS-REFERENCE TO RELATED APPLICATION(S)

This application claims benefit of priority to Korean Patent Application No. 10-2018-0090717 filed on Aug. 3, 2018 in the Korean Intellectual Property Office, the disclosure of which is incorporated herein by reference in its entirety.

TECHNICAL FIELD

The present disclosure relates to a multilayer ceramic capacitor capable of increasing interfacial adhesion between a ceramic body and a side margin portion to improve reliability, and a method of manufacturing the same.

BACKGROUND

In general, electronic elements using a ceramic material such as a capacitor, an inductor, a piezoelectric element, a varistor or a thermistor include a ceramic body formed of a ceramic material, an internal electrode formed inside the body, and an external electrode provided on the surface of the ceramic body to be connected to the internal electrode.

Recently, owing to the miniaturization and multifunctionalization of electronic products, since there is also the tendency of miniaturization and high functionality of chip parts, a multilayer ceramic capacitor is also required to have a small size and to be a high capacity product.

In order to realize the small sized and high capacity multilayer ceramic capacitor, it is necessary to maximize the electrode effective area (increase the effective volume fraction necessary for capacity implementation).

In order to implement the small sized and high capacity multilayer ceramic capacitor as described above, in manufacturing the multilayer ceramic capacitor, an internal electrode may be exposed in the width direction of a body, and thus the internal electrode width direction area is maximized through the marginless design. A method of separately attaching a margin portion to a width direction electrode exposed surface of a chip in an after manufacturing step of manufacturing the chip and before sintering the chip is applied.

However, in the above method, when a side ceramic green sheet is attached to a side surface of the ceramic body through thermocompression bonding, a phenomenon occurs in which a side margin portion is not completely bonded to the side surface of the ceramic body but is partially separated due to weak adhesion between the side margin portion and the ceramic body.

Such a phenomenon of partial separation of the side margin portion may cause appearance defects and may cause deterioration of insulation resistance characteristics and moisture resistance reliability defects.

In particular, when an excessive thermal compression process is performed, so as to increase the interfacial adhesion between the ceramic body and the side margin portion in an ultra-small and high-capacity product, damage may occur to a dielectric layer having a reduced thickness and the internal electrode, causing a problem in which the possibility of deterioration of electrical characteristics and the occurrence of defects further increases.

Therefore, there is a need for research into increasing interfacial adhesion between the ceramic body and the side margin portion in ultra-small and high-capacity products.

SUMMARY

An aspect of the present disclosure may provide a multilayer ceramic capacitor capable of increasing interfacial adhesion between a ceramic body and a side margin portion to improve reliability, and a method of manufacturing the same.

According to an aspect of the present disclosure, a multilayer ceramic capacitor may include a ceramic body including a dielectric layer, a first surface and a second surface opposing each other, a third surface and a fourth surface connecting the first surface and the second surface, respectively; a plurality of internal electrodes disposed inside the ceramic body and exposed to the first and second surfaces, and having one ends exposed to the third surface or the fourth surface; a first side margin portion and a second side margin portion disposed on sides of the plurality of internal electrodes exposed to the first and second surfaces, respectively; and adhesive layers disposed between the first surface of the ceramic body and the first side margin portion and between the second surface of the ceramic body and the second side margin portion, respectively. An average thickness of each of the first and second side margin portions may be 2 µm or more and 10 µm or less.

According to another aspect of the present disclosure, a method of manufacturing a multilayer ceramic capacitor may include preparing a first ceramic green sheet having a plurality of first internal electrode patterns formed at predetermined intervals and a second ceramic green sheet having a plurality of second internal electrode patterns formed at predetermined intervals; forming a ceramic green sheet stacked body by stacking the first ceramic green sheet and the second ceramic green sheet such that the first internal electrode pattern and the second internal electrode pattern overlap with other in a stacking direction of the first and second ceramic green sheets; cutting the ceramic green sheet stacked body such that sides of the first internal electrode pattern and the second internal electrode pattern are exposed in a width direction; and forming a first side margin portion and a second side margin portion by attaching a side surface ceramic sheet on which an adhesive is applied to the exposed side surfaces of the sides of the first internal electrode pattern and the second internal electrode pattern, wherein a thickness of the first and second ceramic green sheets is 0.6 µm or less, and a thickness of the first and second internal electrode patterns is 0.5 µm or less.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Figure 1:
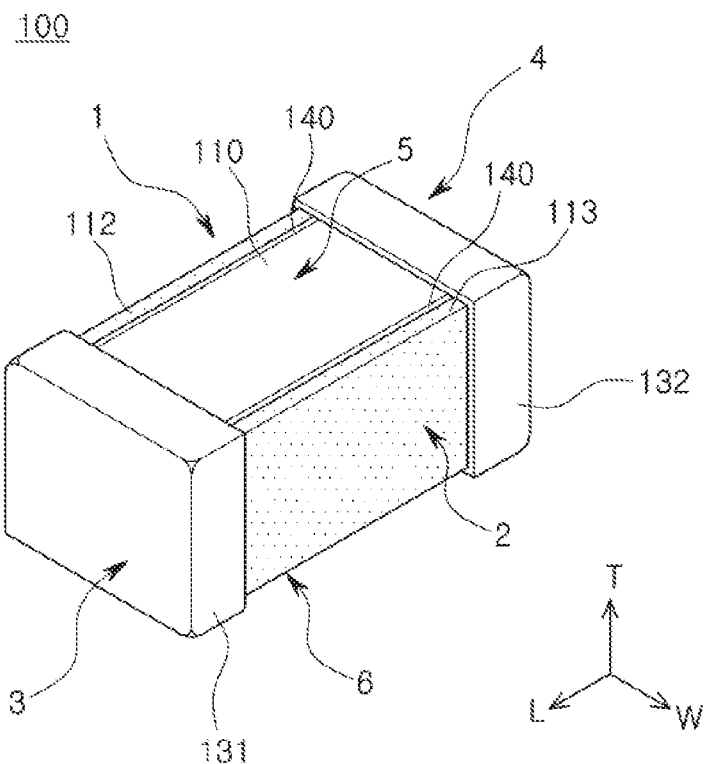
FIG. 1 is a schematic perspective view showing a multilayer ceramic capacitor according to an exemplary embodiment in the present disclosure.

FIG. 1 is a schematic perspective view showing a multilayer ceramic capacitor 100 according to an exemplary embodiment in the present disclosure.

Figure 2:
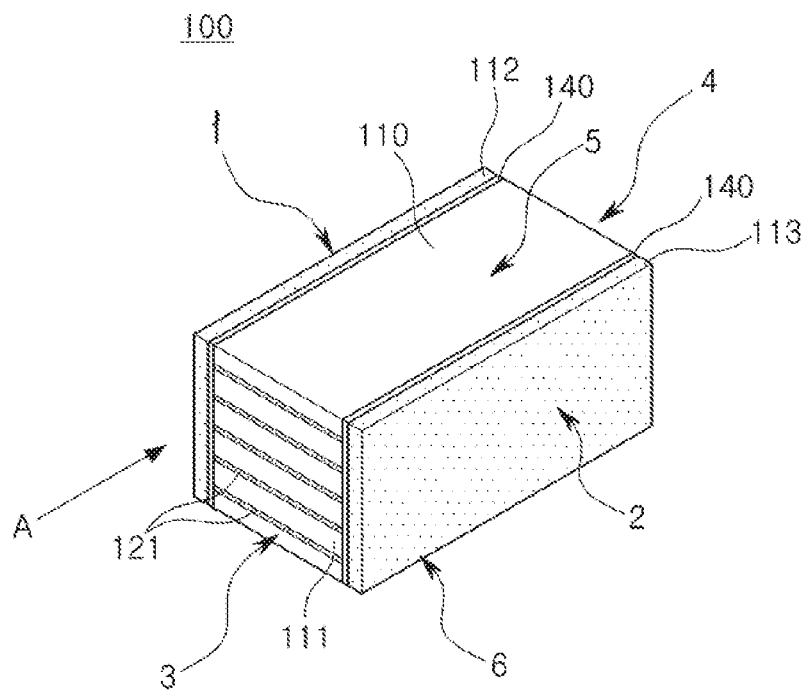
FIG. 2 is a perspective view showing an appearance of a ceramic body of FIG. 1.

FIG. 2 is a perspective view showing an appearance of a ceramic body 110 of FIG. 1.

Figure 3:
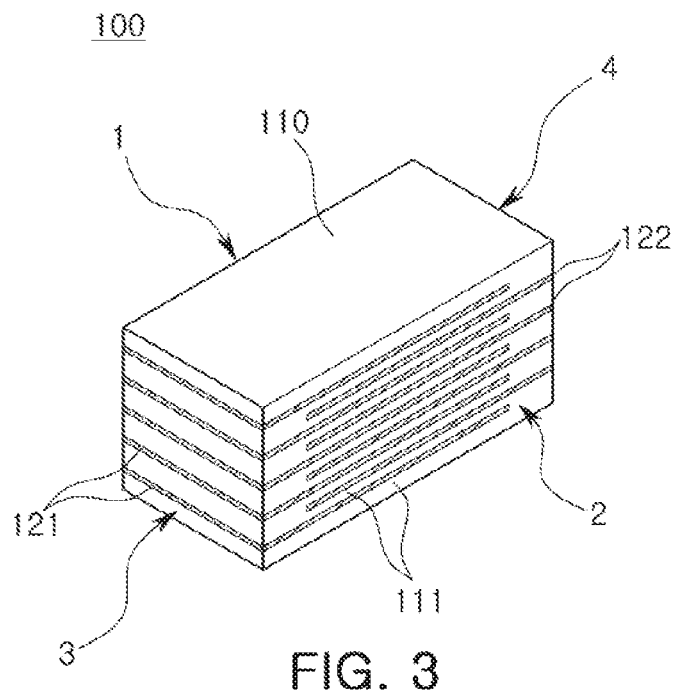
FIG. 3 is a perspective view showing a ceramic green sheet stacked body before sintering of the ceramic body of FIG. 2.

FIG. 3 is a perspective view showing a ceramic green sheet stacked body before sintering of the ceramic body 110 of FIG. 2.

Figure 4:
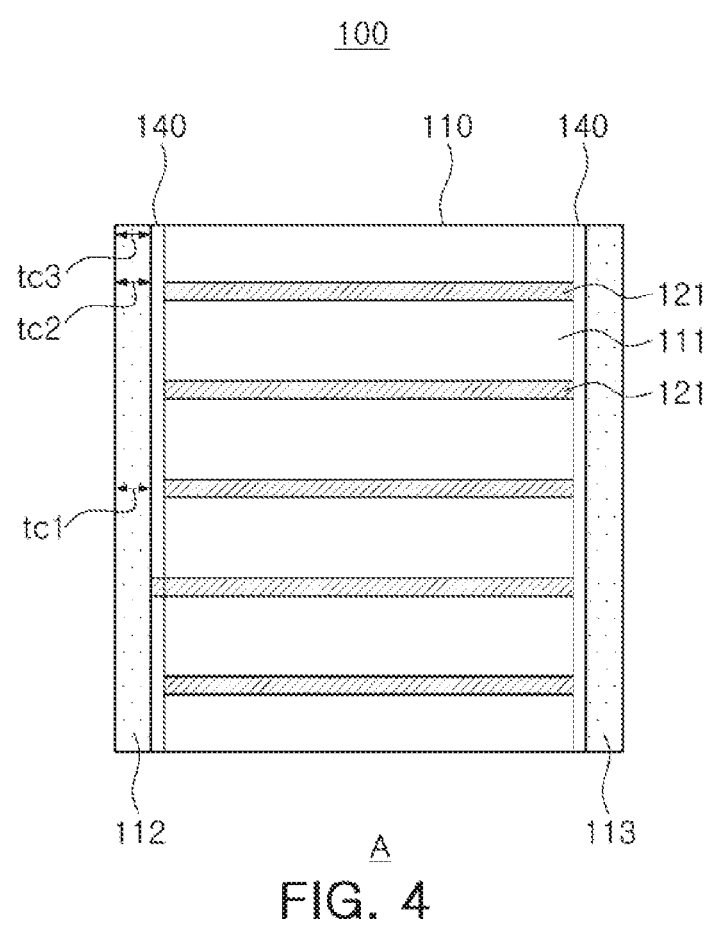
FIG. 4 is a side view seen from a direction A in FIG. 2.

FIG. 4 is a side view seen from a direction A in FIG. 2.

Referring to FIGS. 1 to 4, a multilayer ceramic capacitor 100 according to an exemplary embodiment in the present disclosure includes the ceramic body 110, a plurality of internal electrodes 121 and 122 formed inside the ceramic body 110, and external electrodes 131 and 132 formed on the outer surface of the ceramic body 110.

The ceramic body 110 may have a first surface 1 and a second surface 2 opposing each other and a third surface 3 and a fourth surface 4 connecting the first surface 1 and the second surface 2, respectively, and a fifth surface 5 and a sixth surface 6 which are an upper surface and a lower surface, respectively.

The first surface 1 and the second surface 2 may face each other in a width direction W of the ceramic body 110. The third surface 3 and the fourth surface 4 may be defined as surfaces opposing each other in a longitudinal direction L of the ceramic body 110. The fifth surface 5 and the sixth surface 6 may be defined as surfaces opposing each other in a thickness direction T of the ceramic body 110.

The shape of the ceramic body 110 is not particularly limited, but may be a rectangular parallelepiped shape as shown.

The plurality of internal electrodes 121 and 122 formed inside the ceramic body 110 have one ends exposed to the third surface 3 or the fourth surface 4 of the ceramic body 110.

The internal electrodes 121 and 122 may have a pair of the first internal electrode 121 and the second internal electrode 122 having different polarities.

One end of the first internal electrode 121 may be exposed to the third surface 3. One end of the second internal electrode 122 may be exposed to the fourth surface 4.

The other ends of the first internal electrode 121 and the second internal electrode 122 are formed at regular intervals from the third surface 3 or the fourth surface 4.

The first and second external electrodes 131 and 132 may be formed on the third and fourth surfaces 3 and 4 of the ceramic body 110 and electrically connected to the internal electrode.

The multilayer ceramic capacitor 100 according to an exemplary embodiment in the present disclosure includes the plurality of internal electrodes 121 and 122 disposed inside the ceramic body 110, exposed to the first and second surfaces 1 and 2 and having one ends exposed to the third surface 3 or the fourth surface 4, and a first side margin portion 112 and a second side margin portion 113 disposed on end portions of the internal electrodes 121 and 122 exposed to the first and second surfaces 1 and 2.

The plurality of internal electrodes 121 and 122 are formed inside the ceramic body 110. Each end of the plurality of internal electrodes 121 and 122 is exposed to the first surface 1 and the second surface 2 that are width direction surfaces of the ceramic body 110. The first side margin portion 112 and the second side margin portion 113 are disposed on the exposed end portions.

An average thickness of each of the first side margin portion 112 and the second side margin portion 113 may be 2 μm or more and 10 μm or less. The average thickness of a side margin portion may be measured from an image obtained by scanning a cross section of the ceramic body 110 in the thickness direction using a scanning electron microscope (SEM). For example, a thickness at the predetermined number of points, for example, thirty points, that are equidistant from each other in the thickness direction may be measured from the image obtained by scanning a cross-section of the ceramic body 110 in a width-thickness (W-T) direction taken along a central portion of the ceramic body 110 in the length (L) direction using the scanning electron microscope (SEM), thereby determining the average thickness of a side margin portion by dividing a sum of thicknesses measured at the predetermined number of points by the predetermined number.

According to an exemplary embodiment in the present disclosure, the ceramic body 110 includes a stack structure in which a plurality of dielectric layers 111 are stacked and the first side margin portion 112 and the second side margin portion 113 disposed in both side surfaces of the stack structure.

The plurality of dielectric layers 111 may be in a sintered state such that boundaries between adjacent dielectric layers may be integrated not to be confirmed.

The length of the ceramic body 110 corresponds to a distance from the third surface 3 to the fourth surface 4 of the ceramic body 110.

The length of the dielectric layer 111 forms the distance between the third surface 3 and the fourth surface 4 of the ceramic body 110.

According to an exemplary embodiment in the present disclosure, the length of the ceramic body 110 may be 400 to 1400 μm but is not limited thereto. More specifically, the length of the ceramic body 110 may be 400 to 800 μm, or 600 to 1400 μm.

The internal electrodes 121 and 122 may be formed on the dielectric layer 111 and may be formed inside the ceramic body 110 with a single dielectric layer interposed therebetween by sintering.

Referring to FIG. 3, the first internal electrode 121 is formed on the dielectric layer 111. The first internal electrode 121 is not formed entirely with respect to the longitudinal direction of the dielectric layer 111. That is, one end of the first internal electrode 121 may be formed at a predetermined distance from the fourth surface 4 of the ceramic body 110, and the other end of the first internal electrode 121 may be formed up to the third surface 3 and exposed to the third surface 3.

The end of the first internal electrode 121 exposed to the third surface 3 of the ceramic body 110 is connected to the first external electrode 131.

To the contrary of the first internal electrode 121, one end of the second internal electrode 122 is formed at a predetermined distance from the third surface 3 and the other end of the second internal electrode 122 is exposed to the fourth surface 4 and is connected to the second external electrode 132.

The dielectric layer 111 may have the same width as that of the first internal electrode 121. That is, the first internal electrode 121 may be formed entirely in the width direction of the dielectric layer 111. The dielectric layer 111 may have the same width as that of the second internal electrode 122. That is, the second internal electrode 122 may be formed entirely in the width direction of the dielectric layer 111.

According to an exemplary embodiment in the present disclosure, the width of the dielectric layer 111 and the widths of the internal electrodes 121 and 122 may be 100 μm to 900 μm, but not limited thereto. More specifically, the width of the dielectric layer 111 and the widths of the internal electrodes 121 and 122 may be 100 μm to 500 μm, or 100 μm to 900 μm.

As the ceramic body 110 is miniaturized, the thicknesses of the side margin portions 112 and 113 may affect the electrical characteristics of the multilayer ceramic capacitor 100. According to an exemplary embodiment in the present disclosure, the thicknesses of the side margin portions 112 and 113 are formed to be 10 μm or less, and the characteristic of the miniaturized multilayer ceramic capacitor 100 may be improved.

In an exemplary embodiment in the present disclosure, the internal electrodes 121 and 122 and the dielectric layer 111 are simultaneously cut off and formed, and thus the widths of the internal electrodes 121 and 122 and the width of the dielectric layer 111 may be the same. This will be described in more detail later.

In the present embodiment, the width of the dielectric layer 111 is formed to be the same as the widths of the internal electrodes 121 and 122, and thus the ends of the internal electrodes 121 and 122 may be exposed to the first and second surfaces 1 and 2 in the width direction of the ceramic body 110.

The first side margin portion 112 and the second side margin portion 113 may be formed on both side surfaces in the width direction of the ceramic body 110 where the ends of the internal electrodes 121 and 122 are exposed.

The thicknesses of the first side margin portion 112 and the second side margin portion 113 may be 10 μm or less. The smaller the thicknesses of the first side margin portion 112 and the second side margin portion 113, the relatively wider the overlapping area of the internal electrodes 121 and 122 formed inside the ceramic body 110.

The thicknesses of the first side margin portion 112 and the second side margin portion 113 are not particularly limited as long as the thicknesses are able to prevent short-circuit of the internal electrodes 121 and 122 exposed to the side surfaces of the ceramic body 110. For example, the thicknesses of the first side margin portion 112 and the second side margin portion 113 may be 2 μm or more.

If the thicknesses of the first and second side margin portions 112 and 113 are less than 2 μm, the mechanical strength against external impact may decrease. If the thicknesses of the first and second side margin portions 112 and 113 exceed 10 μm, causing the overlapping area of the internal electrodes 121 and 122 to be relatively reduced, it may be difficult to secure high capacity of the multilayer ceramic capacitor 110.

In order to maximize the capacity of a multilayer ceramic capacitor, a method of making a dielectric layer thinner, a method of highly stacking the thinned dielectric layer, a method of improving the coverage of internal electrodes, etc. are considered.

Further, a method of improving the overlapping area of internal electrodes forming the capacity is considered.

In order to increase the overlapping area of the internal electrodes, a region of a margin portion in which the internal electrodes are not formed must be minimized.

In particular, as the multilayer ceramic capacitor is miniaturized, the region of the margin portion must be minimized in order to increase the overlap area of the internal electrodes.

According to the present embodiment, the internal electrodes 121 and 122 are formed in the entire width direction of the dielectric layer 111, the thicknesses of the side margin portions 112 and 113 are set to 10 μm or less, and thus the overlapping area of the internal electrodes 121 and 122 is wide.

Generally, the thicknesses of the dielectric layer and the internal electrodes become thinner as the dielectric layer becomes highly stacked. Therefore, a phenomenon that the internal electrodes are short-circuited may frequently occur. Also, when the internal electrodes are formed only in a part of the dielectric layer, a step difference due to the internal electrodes may be generated, which may deteriorate the acceleration life and reliability of the insulation resistance.

However, according to the present embodiment, even if the thin internal electrodes and dielectric layer are formed, since the internal electrodes are entirely formed in the width direction of the dielectric layer, the overlapping area of the internal electrodes increases, and thus the capacity of the multilayer ceramic capacitor may be increased.

Also, the acceleration life of insulation resistance may be improved by reducing the step difference due to the internal electrodes, thereby providing the multilayer ceramic capacitor having excellent capacity characteristic and excellent reliability.

According to an exemplary embodiment in the present disclosure, an adhesive layer 140 is disposed between the first side 1 and the second side 2 of the ceramic body 110 and between the first side margin portion 112 and the second side margin portion 113.

A method of forming a first side margin portion and a second side margin portion according to the related art includes attaching side ceramic sheets to the side surfaces of a ceramic body having exposed ends of a first internal electrode pattern and a second internal electrode pattern and applying heat and pressure.

In this case, when the adhesion between the side margin portion and the ceramic body is lowered, there is a problem that the side ceramic sheets are separated, which may cause problems such as appearance defects, reduced insulation resistance, and reduced reliability of moisture resistance.

In order to prevent the above problems, according to the related art, the side margin portion is formed by applying high heat and pressure to enhance the adhesion between the side margin portion and the ceramic body.

However, when such high heat and pressure are applied, damage to the internal electrodes and the dielectric layer having small thicknesses occurs, which may cause a problem that electric characteristics such as short circuit deteriorate.

That is, since the thicknesses of the dielectric layer and the internal electrodes must be small in the ultra-small and high-capacity multilayer ceramic capacitor, the method of forming the side margin portion by applying high heat and pressure according to the related art as described above may cause problems.

According to an exemplary embodiment in the present disclosure, since the first side margin portion 112 and the second side margin portion 113 are formed by attaching side ceramic sheets on which an adhesive is applied to the side surfaces of the ceramic body 110 having exposed ends of a first internal electrode pattern and a second internal electrode pattern, even if low heat and pressure are applied, the adhesion between the side margin portions 112 and 113 and the ceramic body 110 may be enhanced.

Accordingly, damage to the dielectric layer 111 and the internal electrodes 121 and 122 may be minimized even in the ultra small and high capacity multilayer ceramic capacitor 100 to which the dielectric layer 111 and the internal electrodes 121 and 122 having small thicknesses are applied, thereby improving reliability.

According to an exemplary embodiment in the present disclosure, the ultra small multilayer ceramic capacitor 100 includes the dielectric layer 111 having the thickness of 0.4 μm or less and the internal electrodes 121 and 122 having the thickness of 0.4 μm or less.

As in an exemplary embodiment in the present disclosure, when the dielectric layer 111 having the thickness of 0.4 μm or less and the internal electrodes 121 and 122 having the thickness of 0.4 μm or less are applied, in the case of forming the side margin portion by applying high heat and pressure as in the related art, damage may be applied to the dielectric layer 111 and the internal electrodes 121 and 122, thereby causing deterioration of electrical characteristics.

However, in a structure in which the adhesive layer 140 is disposed between the first side 1 and the second side 2 of the ceramic body 110 and between the first side margin portion 112 and the second side margin portion 113 as in an exemplary embodiment in the present disclosure, damage applied to the dielectric layer 111 having the thickness of 0.4 μm or less and the internal electrodes 121 and 122 having the thickness of 0.4 μm or less may be minimized, and thus the reliability may be improved.

The adhesive layer 140 may include a ceramic slurry including ceramic powder and a binder. The ceramic powder may be barium titanate powder, but is not necessarily limited thereto.

When the adhesive layer 140 includes the ceramic slurry including the ceramic powder and the binder, since the adhesive layer 140 is different from the first side margin portion 112 and the second side margin portion 113 in the composition, a boundary confirm between the adhesive layer 140 and the side margin may be possible.

That is, even when the adhesive layer 140 includes the ceramic powder, the composition of the adhesive layer 140 is different from that of the first side margin portion 112 and the second side margin portion 113, and thus the adhesive layer 140 is different from the first side margin portion 112 and the second side margin portion 113 in the compactness. An average thickness of the adhesive layer 140 may be less than an average thickness of the first side margin 112 and an average thickness of the second side margin portion 113.

Specifically, the first side margin portion 112 and the second side margin portion 113 may have a higher compactness than the adhesive layer 140.

Referring to FIG. 4, a ratio of a thickness tc2 of the first side margin portion 112 or the second side margin portion 113 in contact with an end of the internal electrode disposed in the outermost portion with respect to a thickness tc1 of the first side margin portion 112 or the second side margin portion 113 in contact with an end of the internal electrode disposed in the center portion among the plurality of internal electrodes 121 and 122 may be 1.0 or less.

A lowest value of the ratio of the thickness tc2 of the first side margin portion 112 or the second side margin portion 113 in contact with the end of the internal electrode disposed in the outermost portion with respect to the thickness tc1 of the first side margin portion 112 or the second side margin portion 113 in contact with the end of the internal electrode disposed in the center portion is not particularly limited, but may be preferably 0.9 or more.

According to an exemplary embodiment in the present disclosure, since the first or second side margin portion 112 or 113 is formed by attaching the ceramic green sheets to the side surface of the ceramic body 110 unlike the related art, the thickness of the first or second side margin portion 112 or 113 for each position is constant or substantially the same.

That is, according to the related art, since the side margin portion is formed by applying or printing a ceramic slurry, the thickness of the side margin portion for each position has a large deviation.

Specifically, according to the related art, the thickness of the first side margin portion or the second side margin portion in contact with the end of the internal electrode disposed in the center portion of the ceramic body 110 is greater than the thickness of another region.

For example, according to the related art, a ratio of the thickness of the first side margin portion or the second side margin portion in contact with the end of the internal electrode disposed in the outermost portion with respect to the thickness of the first side margin portion or the second side margin portion in contact with the end of the internal electrode disposed in the center portion is less than 0.9, and the deviation of the ratio is large.

In the related art where the thickness of the side margin portion has a large deviation for each position, since the side margin portion occupies a large portion in the same-size multilayer ceramic capacitor, a large size of a capacity forming portion may not be secured, and thus it is difficult to secure high capacity.

Meanwhile, in an exemplary embodiment in the present disclosure, the average thickness of the first and second side margin portions 112 and 113 is 2 μm or more and 10 μm or less, and the ratio of the thickness tc2 of the first side margin portion 112 or the second side margin portion 113 in contact with the end of the internal electrode disposed in the outermost portion with respect to the thickness tc1 of the first side margin portion 112 or the second side margin portion 113 in contact with the end of the internal electrode disposed in the center portion among the plurality of internal electrodes 121 and 122 is 0.9 or more and 1.0 or less, the thickness of the side margin portion is small and the deviation in the thickness is small, and thus the large size of the capacity forming portion may be secured.

As a result, the high capacity multilayer ceramic capacitor may be implemented.

Meanwhile, referring to FIG. 4, a ratio of a thickness tc3 of the first side margin portion 112 or the second side margin portion 113 in contact with an edge of the ceramic body 110 with respect to the thickness tc1 of the first side margin portion 112 or the second side margin portion 113 in contact with the end of the internal electrode disposed in the center portion among the plurality of internal electrodes 121 and 122 may be 1.0 or less.

A lowest value of the thickness tc3 of the first side margin portion 112 or the second side margin portion 113 in contact with the edge of the ceramic body 110 with respect to the thickness tc1 of the first side margin portion 112 or the second side margin portion 113 in contact with the end of the internal electrode disposed in the center portion may be preferably 0.9 or more.

Because of the above characteristic, the large size of the capacity forming portion may be secured owing to a small thickness deviation of the side margin portion for each region, and thus the high capacity multilayer ceramic capacitor may be implemented.

FIGS. 5A to 5F are cross-sectional views and perspective views schematically showing a method of manufacturing a multilayer ceramic capacitor according to another exemplary embodiment in the present disclosure.

According to another exemplary embodiment in the present disclosure, the method of manufacturing the multilayer ceramic capacitor includes preparing a first ceramic green sheet having a plurality of first internal electrode patterns formed at predetermined intervals and a second ceramic green sheet having a plurality of second internal electrode patterns formed at predetermined intervals, forming a ceramic green sheet stacked body by stacking the first ceramic green sheet and the second ceramic green sheet such that the first internal electrode pattern and the second internal electrode pattern overlap with other in a stacking direction of the first and second ceramic green sheets, cutting the ceramic green sheet stacked body such that sides of the first internal electrode pattern and the second internal electrode pattern are exposed in a width direction, and forming a first side margin portion and a second side margin portion by attaching a side surface ceramic sheet on which an adhesive is applied to the exposed side surfaces of the sides of the first internal electrode pattern and the second internal electrode pattern. A thickness of the first and second ceramic green sheets is 0.6 μm or less, and a thickness of the first and second internal electrode patterns is 0.5 μm or less.

Hereinafter, the method of manufacturing the multilayer ceramic capacitor according to another exemplary embodiment in the present disclosure will be described.

Figure 5A:
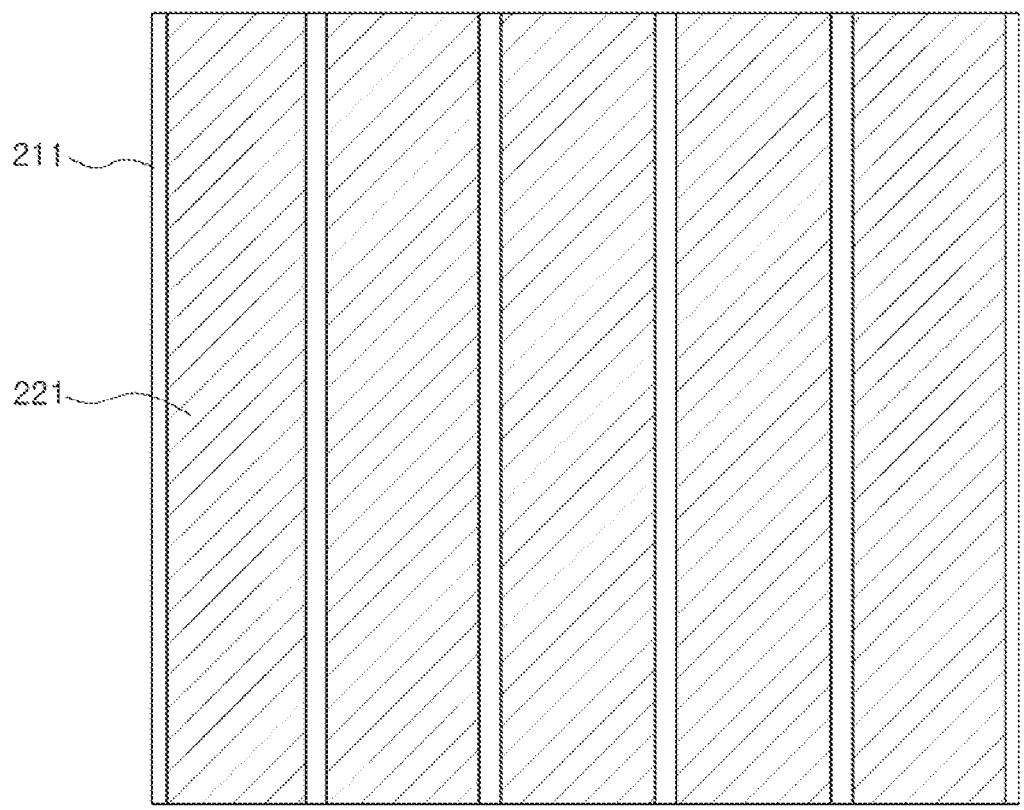
FIGS. 5A to 5F are cross-sectional views and perspective views schematically showing a method of manufacturing a multilayer ceramic capacitor according to another exemplary embodiment in the present disclosure.

As shown in FIG. 5A, a plurality of stripe shape first internal electrode patterns 221 are formed on a ceramic green sheet 211 at predetermined intervals. The plurality of stripe shape first internal electrode patterns 221 may be formed parallel to each other.

The ceramic green sheet 211 may be formed of a ceramic paste including ceramic powder, an organic solvent, and an organic binder.

The ceramic powder may use, but not limited to, a barium titanate ($BaTiO_3$)-based material, a lead composite perovskite-based material, a strontium titanate ($SrTiO_3$)-based material, or the like as a material having a high dielectric constant and may use preferably barium titanate ($BaTiO_3$) powder. The ceramic green sheet 211 is sintered, and thus becomes the dielectric layer 111 constituting the ceramic body 110.

The stripe shape first internal electrode pattern 221 may be formed by using an internal electrode paste including a conductive metal. The conductive metal may include, but not limited to, nickel (Ni), copper (Cu), palladium (Pd), or an alloy thereof.

The method of forming the stripe shape first internal electrode pattern 221 on the ceramic green sheet 211 is not particularly limited, but may be formed through, for example, a printing method such as a screen printing method or a gravure printing method.

Also, although not shown, a plurality of stripe shape second internal electrode patterns 222 may be formed on another ceramic green sheet 211 at predetermined intervals.

Hereinafter, the ceramic green sheet 211 on which the first internal electrode pattern 221 is formed may be referred to as a first ceramic green sheet, and the ceramic green sheet 311 on which the second internal electrode pattern 222 is formed may be referred to as a second ceramic green sheet.

Figure 5B:
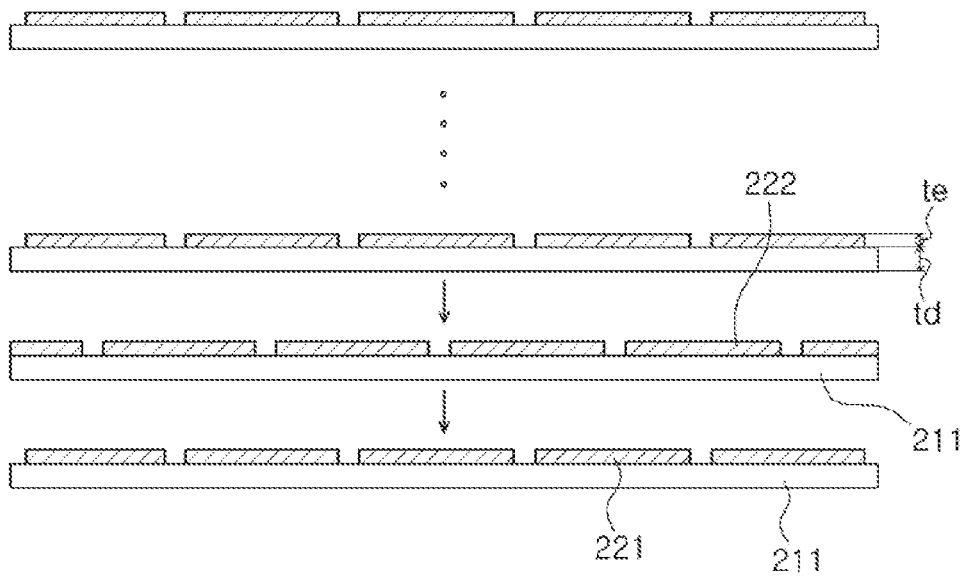

Next, as shown in FIG. 5B, the first and second ceramic green sheets 211 may be alternately stacked such that the stripe shape first internal electrode patterns 221 and the stripe shape second internal electrode patterns 222 are alternately stacked.

Thereafter, the stripe shape first internal electrode pattern 221 may become the first internal electrode 121 and the stripe shape second internal electrode pattern 222 may become the second internal electrode 122.

According to another exemplary embodiment in the present disclosure, a thickness td of the first and second ceramic green sheets 211 is 0.6 μm or less, and a thickness te of the first and second internal electrode patterns 221 and 222 is 0.5 μm or less.

The present disclosure provides a ultra small and high capacity multilayer ceramic capacitor in which a thickness of the dielectric layer 111 is 0.4 μm or less, and a thickness of the internal electrodes 121 and 122 is 0.4 μm or less, and thus the thickness td of the first and second ceramic green sheets 211 is 0.6 μm or less, and the thickness te of the first and second internal electrode patterns 221 and 222 is 0.5 μm or less.

When the ceramic green sheets 211 and the internal electrode patterns 221 and 222 having small thicknesses are applied, in the case where a side margin portion is formed according to the related art, since high heat and pressure are applied, damage may be applied to the dielectric layer 111 and the internal electrodes 121 and 122, which may cause a problem that the electrical characteristic deteriorates.

However, in another exemplary embodiment in the present disclosure, as described later, the adhesive is applied onto the side surface ceramic green sheet other than the ceramic green sheet stacked body and is transferred to side surfaces of the ceramic green sheet stacked body, the adhesion between a ceramic body and the side margin portion may be enhanced only owing to low heat and pressure.

Accordingly, there is no occurrence of defective appearance due to separation of the side margin portion, high insulation resistance, and moisture resistance reliability may be improved.

That is, even when the thickness td of the first and second ceramic green sheets 211 is 0.6 μm or less and the thickness to of the first and second internal electrode patterns 221 and 222 is 0.5 μm or less, the electrical characteristic may be excellent and the reliability may be improved.

Figure 5C:
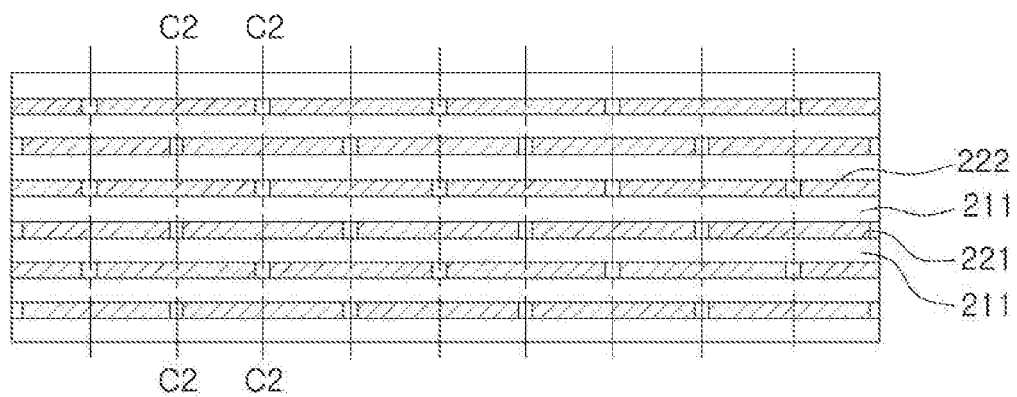
Figure 5D:
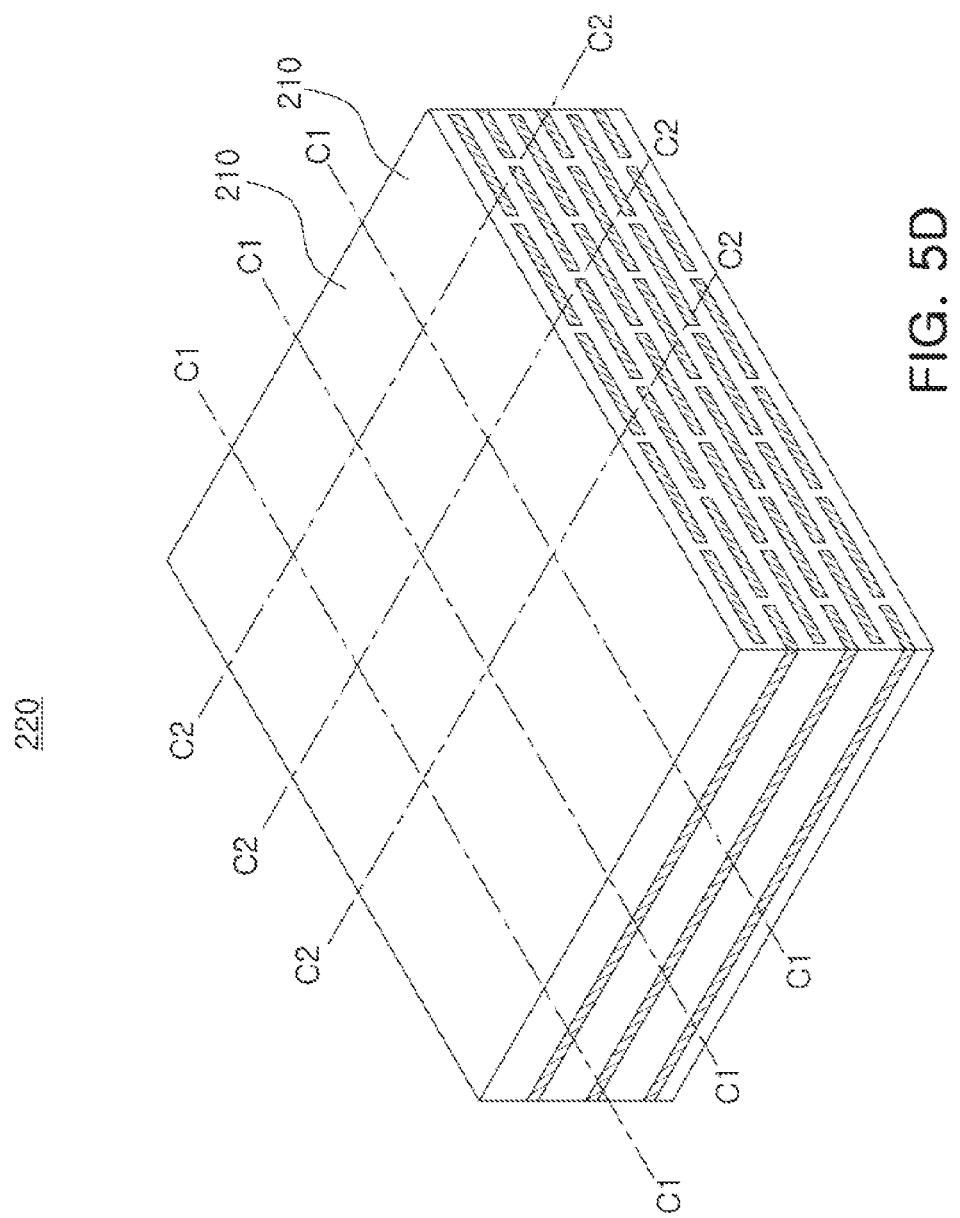

FIG. 5C is a cross-sectional view showing a ceramic green sheet stacked body 220 in which first and second ceramic green sheets are stacked according to exemplary embodiment in the present disclosure. FIG. 5D is a cross-sectional view of the ceramic green sheet stacked body 220 in which first and second ceramic green sheets are stacked.

Referring to FIGS. 5C and 5D, the first ceramic green sheet 211 on which the plurality of parallel stripe shape first internal electrode patterns 221 are printed and the second ceramic green sheet 211 on which the plurality of parallel stripe shape second internal electrode patterns 222 are printed are stacked alternately with each other.

More specifically, intervals between a central portion of the stripe shape first internal electrode patterns 221 printed on the first ceramic green sheet 211 and the stripe shape second internal electrode patterns 222 printed on the second ceramic green sheet 211 may be stacked to be overlapped.

Next, as shown in FIG. 5D, the ceramic green sheet stacked body 220 may be cut so as to cross the plurality of stripe shape first internal electrode patterns 221 and the stripe shape second internal electrode patterns 222. That is, the ceramic green sheet stacked body 210 may become the stacked body 210 cut along cutting lines C1-C1 and C2-C2 that are orthogonal to each other.

More specifically, the stripe shape first internal electrode patterns 221 and the stripe shape second internal electrode patterns 222 may be divided into a plurality of internal electrodes that are cut in a longitudinal direction and have a constant width. At this time, the stack ceramic green sheets 211 are also cut together with the internal electrode patterns 221 and 222. Accordingly, the dielectric layer 111 may be formed to have the same width as the width of the internal electrodes 221 and 222.

Also, the ceramic green sheet stacked body 220 may be cut in accordance with individual ceramic body sizes along the cutting line C2-C2. That is, before forming a first side margin portion and a second side margin portion, the plurality of stack bodies 210 may be formed by cutting a rod shape stack structure into individual ceramic body sizes along the cutting line C2-C2.

That is, the rod shape stack structure may be cut by cutting lines having the same predetermined interval formed between the central portion of the overlapped first internal electrode 221 and the second internal electrode 222. Accordingly, one end of each of the first internal electrode 221 and the second internal electrode 222 may be alternately exposed to the cut surface.

Thereafter, the first side margin portion and the second side margin portion may be formed on first and second side surfaces of the stacked body 210.

Figure 5E:
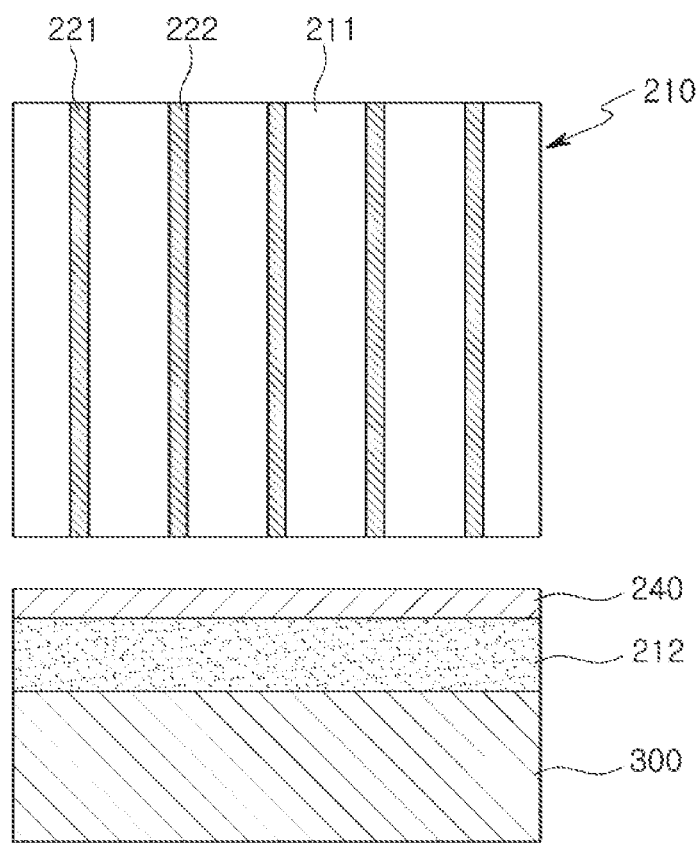

Next, as shown in FIG. 5E, a first side margin portion 212 and a second side margin portions (not shown) may be formed on the first and second side surfaces of the stacked body 210, respectively.

Specifically, a method of forming the first side margin portion 212 manufactures a side surface ceramic green sheet 212 having an upper portion to which an adhesive 240 is applied and disposes the side surface ceramic green sheet 212 to which the adhesive 240 is applied on a punching elastic member 300 formed of rubber.

Next, the stacked body 210 is rotated 90 degrees such that the first surface of the stacked body 210 faces the side surface ceramic green sheet 212 to which the adhesive 240 is applied, and then the stacked body 210 is pressed and adhered to the side surface ceramic green sheet 212 to which the adhesive 240 is applied.

In another exemplary embodiment in the present disclosure, since the adhesive 240 is applied onto the side surface ceramic green sheet 212, the side surface ceramic green sheet 212 may be transferred to the side surfaces of the stacked body 210 at low temperature and low pressure conditions unlike the related art.

Thus, damage to the stacked body 210 may be minimized, the electrical characteristics of the multilayer ceramic capacitor may be prevented from lowering after sintering, and the reliability may be improved.

When the stacked body 210 is pressed and adhered to the side surface ceramic green sheet 212 to which the adhesive 240 is applied to transfer the side surface ceramic green sheet 212 to the stacked body 210, owing to the punching elastic material 300 of a rubber material, the side surface ceramic green sheet 212 may be formed up to a side edge portion of the stacked body 210, and the remaining portion may be cut.

Figure 5F:
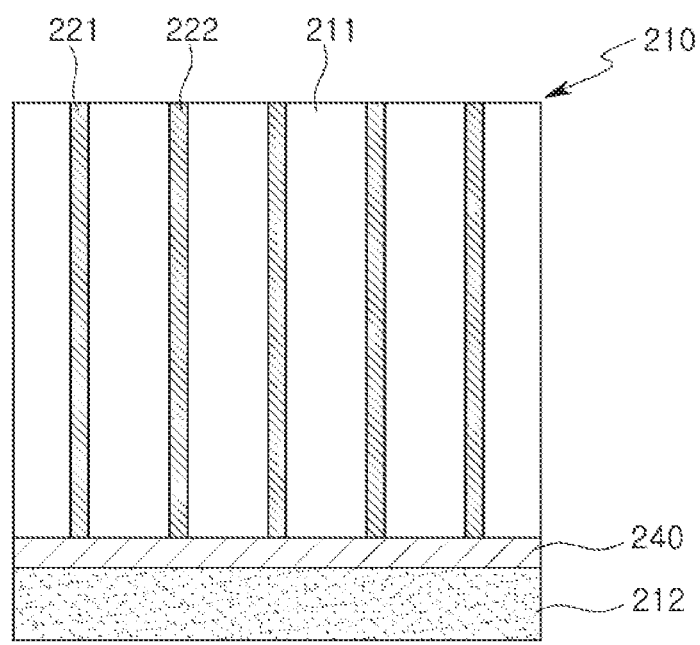

In FIG. 5F, the side surface ceramic green sheet 212 onto which the adhesive 240 is applied is formed up to the side edge portion of the stacked body 210.

Thereafter, the second side margin portion may be formed on the second side surface of the stacked body 210 by rotating the stacked body 210.

Next, the stacked body 210 having the first and second side margin portions on both sides of the stacked body 210 may be fired and sintered to form a ceramic body.

Thereafter, external electrodes may be respectively formed on a third side surface of the ceramic body where the first internal electrode is exposed and on a fourth side surface of the ceramic body where the second internal electrode is exposed.

According to another exemplary embodiment in the present disclosure, the thickness of the side surface ceramic green sheet is small and has a small deviation, and thus the large size of a capacity forming portion may be secured.

Specifically, since the average thickness of the first and second side margin portions 112 and 113 after sintering is 2 µm or more and 10 µm or less, and the deviation of the thickness of each of the first and second side margin portions 112 and 113 is small, the large size of the capacity forming portion may be secured.

As a result, the high capacity multilayer ceramic capacitor may be implemented.

The description of the same features as those in the above-described embodiment of the present disclosure will be omitted here to avoid redundancy.

Hereinafter, the present disclosure will be described in more detail with reference to experimental examples. However, the present disclosure is not intended to limit the scope of the present disclosure.

Experimental Example

According to exemplary embodiment in the present disclosure, there is provided a comparative example in which a side margin portion is formed only by using a side surface ceramic green sheet, and an embodiment in which a side margin portion is formed by using a side surface ceramic green sheet to which an adhesive is applied.

A ceramic green sheet stacked body is formed by attaching the side surface ceramic green sheets of the comparative example and the embodiment to electrode exposure portions of a green chip where an internal electrode is exposed in a width direction and has no margin such that a side margin portion may be formed.

A multilayer ceramic capacitor green chip of a 0603 size (Width×Length×Height: 0.6 mm×0.3 mm×0.3 mm) is manufactured by applying certain temperature and pressure under a condition of minimizing the deformation of the chip and attaching the side surface ceramic green sheets to both sides of the ceramic green sheet stacked body.

In a step of attaching the side surface ceramic green sheets, low temperature and pressure are applied unlike the related art. Specifically, the step is performed at 90° C. or less and under the pressure condition of 0.5 ton or less.

The completely manufactured multilayer ceramic capacitor specimens are subjected to plasticizing processing in a nitrogen atmosphere at a temperature of 400° C. or less, are sintered under the conditions of a sintering temperature of 1200° C. or less and a hydrogen concentration of 0.5% $H_2$ or less, and then electrical characteristics such as appearance defects, insulation resistance and moisture resistance characteristics are comprehensively verified.

In the comparative example in which the side margin portion is formed only by using the side surface ceramic green sheet, since low temperature and pressure are applied when forming the side margin portion, the appearance defect occurs that the side margin portion is separated from the body, which causes problems that insulation resistance deteriorates and moisture resistance characteristic deteriorates.

However, in embodiment in which the side margin portion is formed by using the side surface ceramic green sheet onto which the adhesive is applied, the adhesion between the ceramic body and the side margin portion is excellent even when low temperature and pressure are applied, no separation defect occurs, insulation resistance is excellent, and moisture resistance characteristic is enhanced.

Meanwhile, when the side margin portion is formed by using the side surface ceramic green sheet onto which an adhesive is not applied like a multilayer ceramic capacitor in the related art, a problem occurs that the side margin portion and the ceramic body are separated from each other, which may cause problems such as appearance defects, reduced insulation resistance, and reduced reliability of moisture resistance.

In order to prevent the above problems, according to the related art, the side margin portion is formed by applying high heat and pressure to enhance the adhesion between the side margin portion and the ceramic body.

Specifically, according to the related art, even when the side margin portion is formed by applying high heat and pressure of 110° C. and 1.0 ton, a problem of separation defect occurs. In the case of applying low heat and pressure of 90° C. and 0.5 ton as in the embodiment of the present disclosure, problems such as appearance defect, reduced insulation resistance, and reduced reliability of moisture resistance frequently occur.

As set forth above, according to an exemplary embodiment in the present disclosure, internal electrodes are formed entirely in a width direction of a dielectric layer and exposed to side surfaces in a width direction of a ceramic body, and then first and second side margin portions are separately attached, an adhesive is applied onto a side surface ceramic sheet, other than the ceramic body, and the first and second side margin portions are formed on the side surfaces of the ceramic body, and thus the interfacial adhesion between the ceramic body and the side margin portions may be increased, thereby reducing the appearance defect.

Further, the interfacial adhesion between the ceramic body and the side margin portions may be increased, and thus the insulation resistance may be high and the moisture resistance reliability may be improved.

While exemplary embodiments have been shown and described above, it will be apparent to those skilled in the art that modifications and variations could be made without departing from the scope in the present disclosure as defined by the appended claims.

What is claimed is:

1. A multilayer ceramic capacitor comprising:
a ceramic body including dielectric layers, a first surface and a second surface opposing each other, a third surface and a fourth surface connecting the first surface and the second surface, respectively;
a plurality of internal electrodes disposed inside the ceramic body and exposed to the first and second surfaces, and having one ends exposed to the third surface or the fourth surface, the dielectric layers and the plurality of internal electrodes being alternately disposed;
a first side margin portion and a second side margin portion disposed on sides of the plurality of internal electrodes exposed to the first and second surfaces, respectively;
adhesive layers disposed between the first surface of the ceramic body and the first side margin portion and between the second surface of the ceramic body and the second side margin portion, respectively;
a first external electrode disposed on the third surface of the ceramic body and covering respective first portions of the first, second, fifth, and sixth surfaces; and
a second external electrode disposed on the fourth surface of the ceramic body and covering respective second portions of the first, second, fifth, and sixth surfaces,
wherein an average thickness of each of the first and second side margin portions is 2 μm or more and less than 10 μm,
the first side margin portion and the second side margin portion each have a compactness greater than that of the adhesive layers,
a thickness of one of the plurality of internal electrodes is 0.4 μm or less,
each of the plurality of internal electrodes is composed of a same material extending between the adhesive layers respectively disposed on the first and second surfaces of the ceramic body, and $0.9 \leq tc2/tc1 < 1$, in which $tc2$ is a thickness of the first side margin portion or the second side margin portion aligned with an end of an internal electrode disposed in an outermost portion of the ceramic body among the plurality of internal electrodes, and $tc1$ is a thickness of the first side margin portion or the second side margin portion aligned with an end of an internal electrode disposed in a center portion of the ceramic body among the plurality of internal electrodes.

2. The multilayer ceramic capacitor of claim 1, wherein $tc3/tc1 \leq 1.0$, in which $tc3$ is a thickness of the first side margin portion or the second side margin portion aligned with an edge of the ceramic body.

3. The multilayer ceramic capacitor of claim 1, wherein an average thickness of each of the adhesive layers is less than that of each of the first and second side margin portions.

4. The multilayer ceramic capacitor of claim 1, wherein the adhesive layers are made of a material different from that used to make the first and second side margin portions.

5. The multilayer ceramic capacitor of claim 1, wherein a ratio of a lowest value of a thickness of the first side margin portion or the second side margin portion aligned with an edge of the ceramic body to $tc1$, is 0.9 or more.

6. The multilayer ceramic capacitor of claim 1, wherein a thickness of one of the dielectric layers is 0.4 μm or less.

7. A method of manufacturing a multilayer ceramic capacitor, the method comprising:
preparing a first ceramic green sheet having a plurality of first internal electrode patterns formed at predetermined intervals and a second ceramic green sheet having a plurality of second internal electrode patterns formed at predetermined intervals;
forming a ceramic green sheet stacked body by stacking the first ceramic green sheet and the second ceramic green sheet such that the first internal electrode pattern and the second internal electrode pattern overlap with other in a stacking direction of the first and second ceramic green sheets;
cutting the ceramic green sheet stacked body such that sides of the first internal electrode pattern and the second internal electrode pattern are exposed in a width direction;
forming a first side margin portion and a second side margin portion by attaching a side surface ceramic sheet on which an adhesive layer is respectively applied to the exposed side surfaces of the sides of the first internal electrode pattern and the second internal electrode pattern;

sintering the ceramic green stacked body with the first and second side margin portions to form a ceramic body, the ceramic body having first and second surfaces on which the first and second side margin portions are respectively disposed, third and fourth surfaces from which respective ends of the first and second internal electrode patterns are alternatively exposed, and fifth and sixth surfaces connected to the first to the fourth surfaces, respectively;

forming a first external electrode on the third surface of the ceramic body and covering respective first portions of the first, second, fifth, and sixth surfaces; and forming a second external electrode disposed on the fourth surface of the ceramic body and covering respective second portions of the first, second, fifth, and sixth surfaces, wherein the side surface ceramic green sheet is applied on the exposed side surfaces of the sides of the first internal electrode pattern and the second internal electrode pattern at a temperature of 90° C. or less, a thickness of the first and second internal electrode patterns is 0.5 μm or less, the first side margin portion and the second side margin portion each have a compactness greater than that of the adhesive layers, an average thickness of each of the first and second side margin portions is 2 μm or more and less than 10 μm, after the sintering, a thickness of an internal electrode made of one of the first and second internal electrode patterns is 0.4 μm or less, each internal electrode is composed of a same material extending between the adhesive layers respectively disposed on the first and second surfaces of the ceramic body, and after the sintering, $0.9 \leq tc2/tc1 < 1$, in which tc2 is a thickness of the first side margin portion or the second side margin portion aligned with an end of an internal electrode disposed in an outermost portion of the ceramic body among a plurality of internal electrodes embedded therein, and tc1 is a thickness of the first side margin portion or the second side margin portion aligned with an end of an internal electrode disposed in a center portion of the ceramic body among the plurality of internal electrodes.

8. The method of claim 7, wherein the adhesive is applied onto the side surface ceramic sheet by using a printing method.

9. The method of claim 7, wherein $tc3/tc1 \leq 1.0$, in which tc3 is a thickness of the first side margin portion or the second side margin portion aligned with an edge of the ceramic body.

10. The method of claim 7, wherein the side surface ceramic green sheet is applied on the exposed side surfaces of the sides of the first internal electrode pattern and the second internal electrode pattern under a pressure of 0.5 ton or less.

11. The method of claim 7, wherein a thickness of the first and second ceramic green sheets is 0.6 μm or less, and
after the sintering a thickness of a dielectric layer made of one of the first and second ceramic green sheets and being in contact with the internal electrode is 0.4 μm or less.

12. A method of manufacturing a multilayer ceramic capacitor, the method comprising:

preparing a first ceramic green sheet having a plurality of first internal electrode patterns formed at predetermined intervals and a second ceramic green sheet having a plurality of second internal electrode patterns formed at predetermined intervals;

forming a ceramic green sheet stacked body by stacking the first ceramic green sheet and the second ceramic green sheet such that the first internal electrode pattern and the second internal electrode pattern overlap with other in a stacking direction of the first and second ceramic green sheets;

cutting the ceramic green sheet stacked body such that sides of the first internal electrode pattern and the second internal electrode pattern are exposed in a width direction;

forming a first side margin portion and a second side margin portion by attaching a side surface ceramic sheet on which an adhesive layer is respectively applied to the exposed side surfaces of the sides of the first internal electrode pattern and the second internal electrode pattern;

sintering the ceramic green stacked body with the first and second side margin portions to form a ceramic body, the ceramic body having first and second surfaces on which the first and second side margin portions are respectively disposed, third and fourth surfaces from which respective ends of the first and second internal electrode patterns are alternatively exposed, and fifth and sixth surfaces connected to the first to the fourth surfaces, respectively;

forming a first external electrode on the third surface of the ceramic body and covering respective first portions of the first, second, fifth, and sixth surfaces; and forming a second external electrode disposed on the fourth surface of the ceramic body and covering respective second portions of the first, second, fifth, and sixth surfaces, wherein a thickness of the first and second internal electrode patterns is 0.5 μm or less, the first side margin portion and the second side margin portion each have a compactness greater than that of the adhesive layers, an average thickness of each of the first and second side margin portions is 2 μm or more and less than 10 μm, after the sintering, a thickness of an internal electrode made of one of the first and second internal electrode patterns is 0.4 μm or less, each internal electrode is composed of a same material extending between the adhesive layers respectively disposed on the first and second surfaces of the ceramic body, and after the sintering, $0.9 \leq tc2/tc1 < 1$, in which tc2 is a thickness of the first side margin portion or the second side margin portion aligned with an end of an internal electrode disposed in an outermost portion of the ceramic body among a plurality of internal electrodes embedded therein, and tc1 is a thickness of the first side margin portion or the second side margin portion aligned with an end of an internal electrode disposed in a center portion of the ceramic body among the plurality of internal electrodes.

13. The method of claim 12, wherein the adhesive is applied onto the side surface ceramic sheet by using a printing method.

14. The method of claim 12, wherein $tc3/tc1 \leq 1.0$, in which tc3 is a thickness of the first side margin portion or the second side margin portion aligned with an edge of the ceramic body.

15. The method of claim 12, wherein a thickness of the first and second ceramic green sheets is 0.6 μm or less, and
after the sintering a thickness of a dielectric layer made of one of the first and second ceramic green sheets and being in contact with the internal electrode is 0.4 μm or less.

16. The method of claim 12, wherein after the sintering, a ratio of a lowest value of a thickness of the first side margin portion or the second side margin portion aligned with an edge of the ceramic body to tc1, is 0.9 or more.

17. A multilayer ceramic capacitor comprising:
a ceramic body including a dielectric layer, a first surface and a second surface opposing each other, a third surface and a fourth surface connecting the first surface and the second surface, respectively;
a plurality of internal electrodes disposed inside the ceramic body and exposed to the first and second surfaces, and having one ends exposed to the third surface or the fourth surface;
a first side margin portion and a second side margin portion disposed on sides of the plurality of internal electrodes exposed to the first and second surfaces, respectively;
adhesive layers disposed between the first surface of the ceramic body and the first side margin portion and between the second surface of the ceramic body and the second side margin portion, respectively;
a first external electrode disposed on the third surface of the ceramic body and covering respective first portions of the first, second, fifth, and sixth surfaces; and
a second external electrode disposed on the fourth surface of the ceramic body and covering respective second portions of the first, second, fifth, and sixth surfaces,
wherein an average thickness of each of the first and second side margin portions is 2 μm or more and 10 μm or less,
the first side margin portion and the second side margin portion each have a compactness greater than that of the adhesive layers,
a thickness of one of the dielectric layers is 0.4 μm or less,
each of the plurality of internal electrodes is composed of a same material extending between the adhesive layers respectively disposed on the first and second surfaces of the ceramic body, and
$0.9 \leq tc2/tc1 < 1$, in which tc2 is a thickness of the first side margin portion or the second side margin portion aligned with an end of an internal electrode disposed in an outermost portion of the ceramic body among the plurality of internal electrodes, and tc1 is a thickness of the first side margin portion or the second side margin portion aligned with an end of an internal electrode disposed in a center portion of the ceramic body among the plurality of internal electrodes.

18. The multilayer ceramic capacitor of claim 17, wherein an average thickness of each of the adhesive layers is less than that of each of the first and second side margin portions.

19. The multilayer ceramic capacitor of claim 17, wherein the adhesive layers are made of a material different from that used to make the first and second side margin portions.

* * * * *